A. E. BREWERTON.
APPARATUS FOR INDICATING AND RECORDING THE DIRECTION AND DISTANCE
OF TRAVEL OF VEHICLES.
APPLICATION FILED JUNE 4, 1919.
1,415,624.
Patented May 9, 1922.
3 SHEETS—SHEET 3.
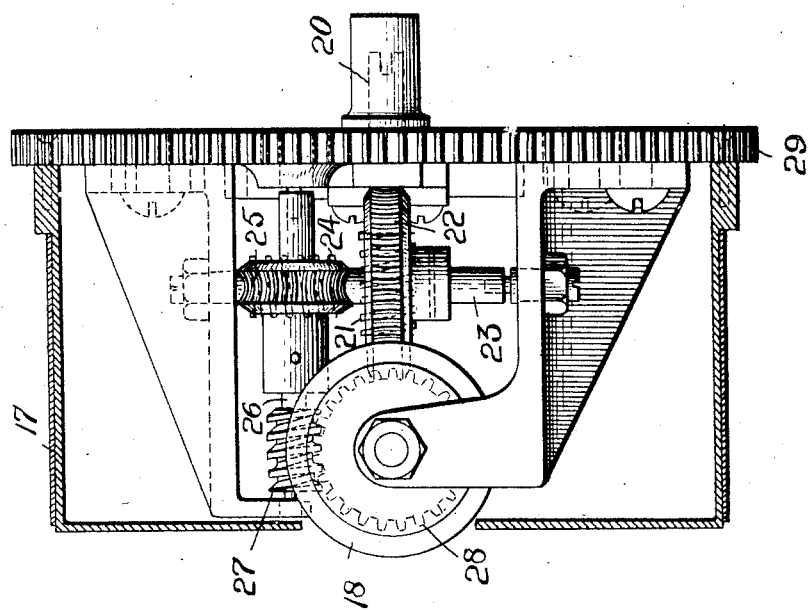
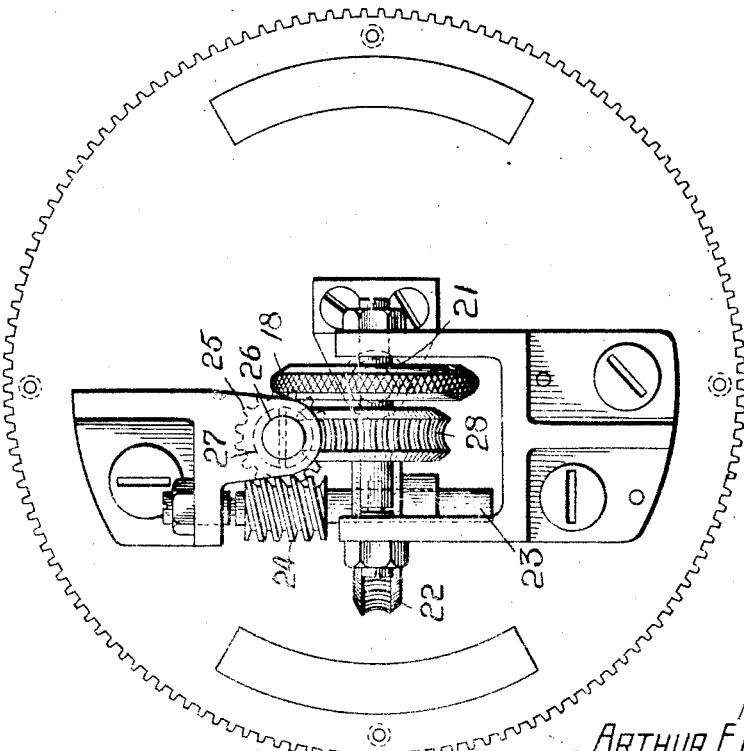
INVENTOR.
ARTHUR E. BREWERTON.
BY Herbert H. Thompson
his ATTORNEY

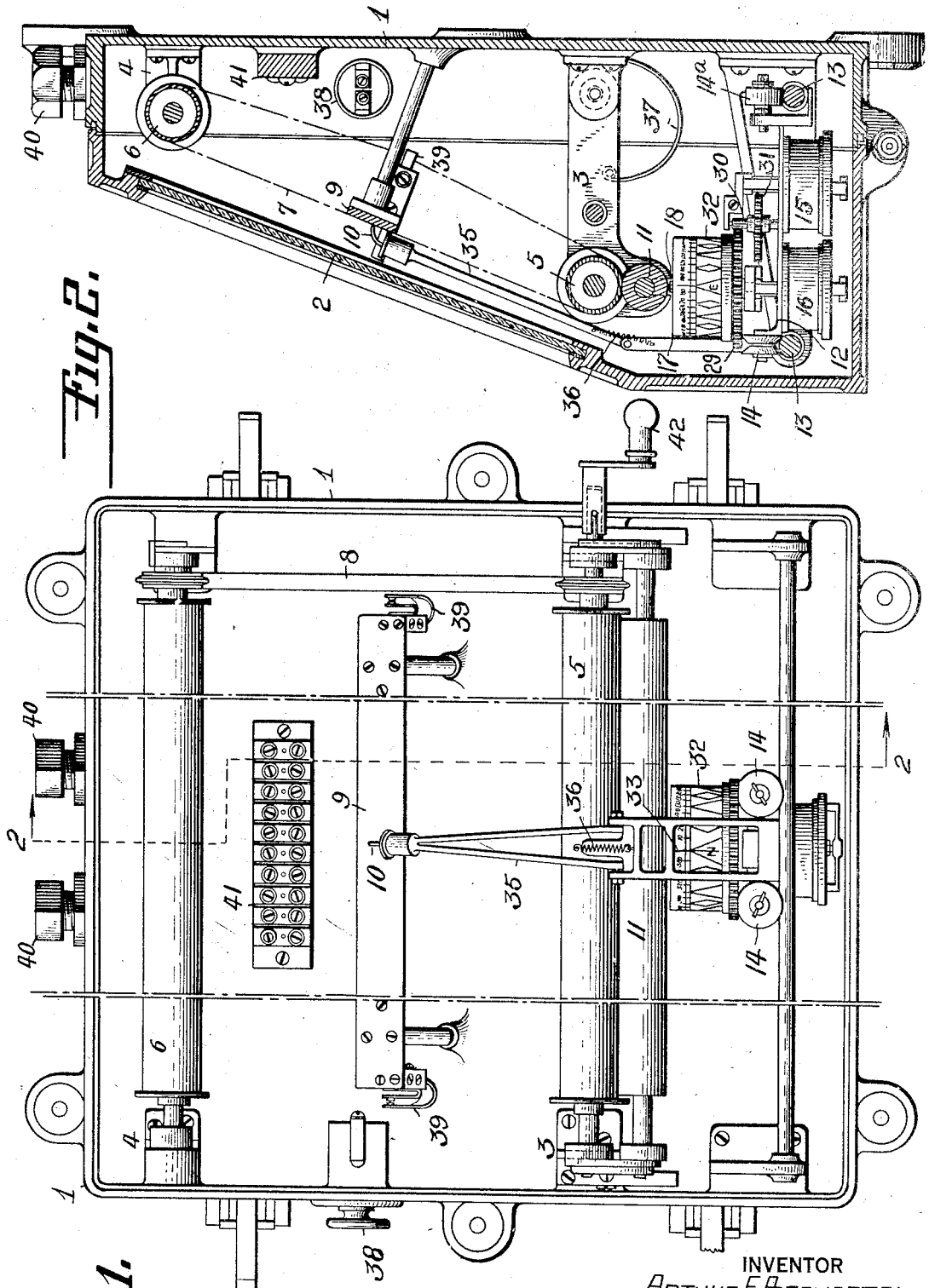

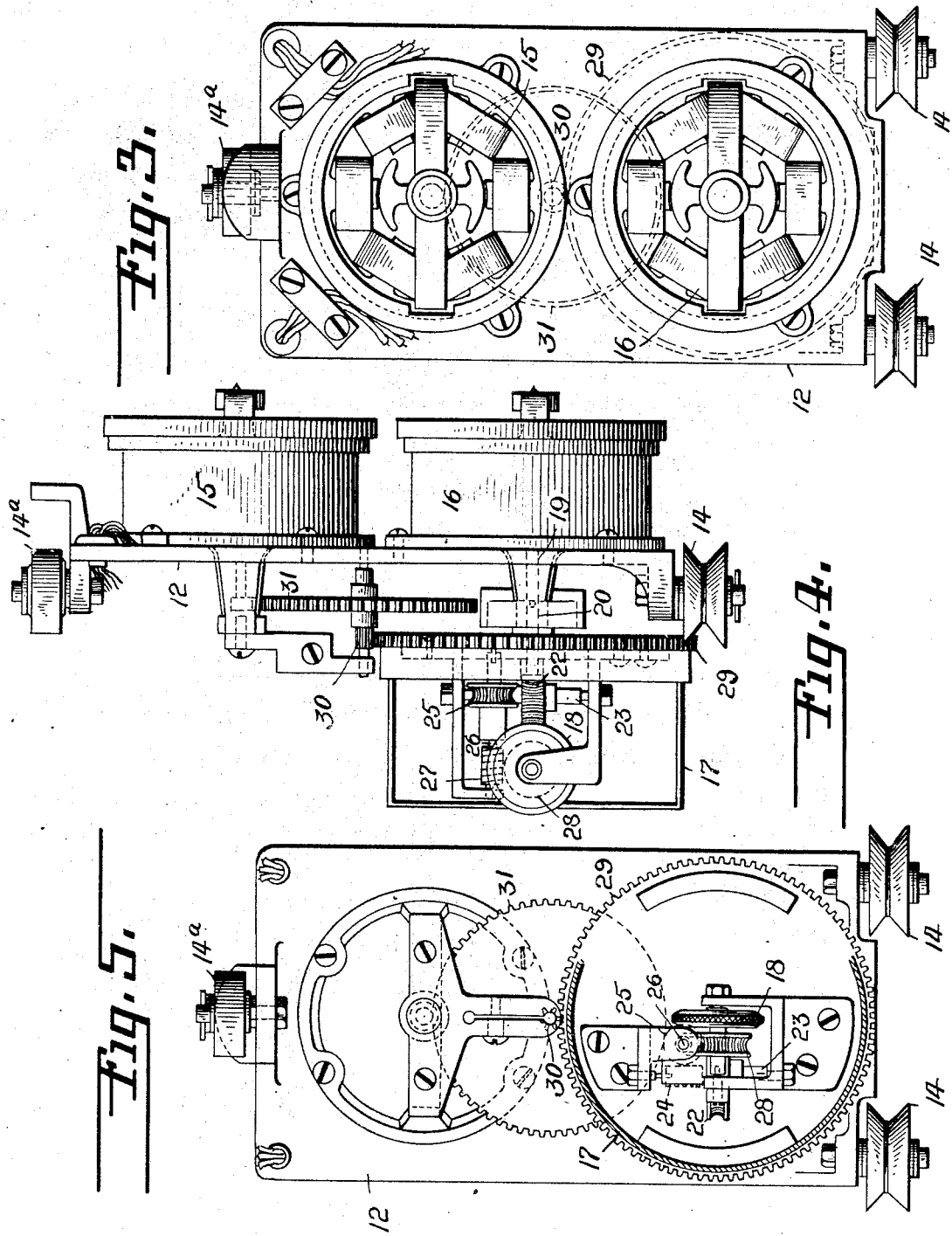

UNITED STATES PATENT OFFICE.

ARTHUR ERNEST BREWERTON, OF WANDSWORTH COMMON, LONDON, ENGLAND, ASSIGNOR TO THE SPERRY GYROSCOPE COMPANY, OF BROOKLYN, NEW YORK, A CORPORATION OF NEW YORK.

APPARATUS FOR INDICATING AND RECORDING THE DIRECTION AND DISTANCE OF TRAVEL OF VEHICLES.

1,415,624.  Specification of Letters Patent.  Patented May 9, 1922.

Application filed June 4, 1919. Serial No. 301,767.

*To all whom it may concern:*

Be it known that I, ARTHUR ERNEST BREWERTON, a subject of the King of Great Britain, residing at 34 Eatonville Road, Wandsworth Common, in the county of London, England, have invented certain new and useful Improvements in Apparatus for Indicating and Recording the Direction and Distance of Travel of Vehicles, of which the following is a specification.

This invention relates to apparatus for indicating and recording the direction and distance of travel of a vehicle and more particularly to apparatus for recording upon a chart the course of a ship.

According to this invention the apparatus comprises a chart movable in one axis or direction in its own plane and a carriage carrying a marking device for making a record on the chart and movable along an axis at right angles to said first mentioned axis, the said carriage carrying propelling mechanism which drives the carriage and the chart at speeds the ratio of which is equal to the ratio of the two components of the direction being traversed at any instant by the ship or other vehicle. Preferably the carriage propels itself by means of a wheel frictionally engaging the paper or an intermediate member driving the same, the said wheel being driven at a speed proportional to the speed of the vessel, the axis of the said wheel also being rotatable about an axis in its own plane normal to either the paper or intermediate driving member at the point of contact of the wheel therewith. The carriage mechanism consists of means for receiving the speed and direction indicating transmissions from the respective apparatus in other parts of the vessel and converting them into the required rotations of the friction wheel, said rotations being about its own axis for speed translation and about the axis within its plane for directional translation. The speed may be transmitted mechanically if desired but preferably electrically in any suitable way for example, by three phase transmission, step-by-step continuous current motors operated either by single or multiple contact transmitters, or continuous current motors operated or controlled by a chaser system. Preferably a step-by-step motor is employed driven by a transmitter which is in turn driven by the engine shafting or the ship's log, this motor being hereinafter referred to as the "log motor". Another motor hereinafter termed the "compass motor" is driven by the direction indicating instrument of the ship such as the gyro compass transmitter. The carriage of the instrument comprises an arrangement of mechanism carrying the log motor and compass motor on rails or guides, the log motor serving to drive the carriage either on its rails or to drive the paper, or both according to the direction of the plane of the wheel's rotation set by the compass motor. The carriage also carries a pencil arm for marking on the paper and accordingly traces the true course of a vessel on the paper as interpreted by the separate components of motion imparted to the carriage and the paper.

In order that the invention may be clearly understood and readily carried into effect the same will now be more fully described with reference to the accompanying drawings which illustrate one method of carrying the invention into effect and in which:—

Figure 1 shows a front view of the complete instrument,

Figure 2 shows a section on the line 2—2 in Figure 1.

Figure 3 shows a plan of the carriage viewed from the under-side.

Figure 4 shows a side elevation of the carriage,

Figure 5 shows a plan of the top-side of the carriage, and

Figures 6 and 7 show respectively enlarged details of the plan and sectional elevation of the carriage and the details of transmission to the propelling wheel.

In Figures 1 and 2, 1 shows the case for containing the instrument, fitted with a window 2 through which the course traced by the pencil may be viewed. While it will be evident that the chart or paper may be arranged equally well on a flat surface movable by friction wheel 18, later to be mentioned, I have, for purposes of illustration, shown said chart as comprising a roll of paper 7 carried by rollers 5 and 6. Said roll of paper may be wound off one roller on to the other. One of these rollers is provided, with a spring connection between its periphery and its centre spindle, this connection having sufficient tension to enable the paper to be stretched taut over the support 9 against which the pencil 10 travels. The spindles of the two rolls are connected by a suitable chain or band 8.

An intermediate roll 11 in contact with the roller 5 may be provided. Below this roller the pencil carriage 12 is shown as travelling on rails 13 the carriage being provided with three supporting wheels 14, 14 and 14ª. The pencil carriage consists of a suitable framework carrying two motors, one 15 of which is the compass motor or directional motor, and the other 16 the log motor. The latter is arranged concentrically with the gear box 17 above it through which its rotary movement is conveyed to the propelling friction wheel 18 shown in Figures 4, 5, 6, and 7. The compass motor 15 is geared in such a manner as to rotate the gear box in its entirety over the log motor, thus setting the plane of rotation of the propelling wheel in any direction relative to the paper roll above it. The log motor 16 rotates the propelling wheel 18 about the axis of the wheel and thus causes the carriage to travel along the rails or the movement of the paper roll at speeds proportional to the components of direction and to the speed of the vessel.

It should be observed that the propelling wheel 18 is arranged on a diameter of the gear box with the axis of the gear box coincident with the point of contact with the intermediate roll 11 so that rotation of the gear box caused by the directional mechanism of the instrument maintains a relative fixity of contact with the paper. It should also be observed that the log transmission to the gear box is axially coincident with the gear box, as shown in Figure 4 in which the log motor spindle 19 engages with the notched end of the worm spindle 20 (Figures 4 and 7) in the centre of the box 17. This spindle 20 is fitted with a worm 21 axially coincident with the axis of the box and in line with the plane of the propelling wheel 18. This worm engages with a wheel 22 at right angles to the propelling wheel. On the spindle 23 of the wheel 22 is a second worm 24 which engages with a second worm wheel 25. On the spindle 26 of the wheel 25 a third worm 27 is provided which engages with a worm wheel 28 carried by the axis of the propelling wheel 18. With this arrangement the log motor runs at a comparatively high speed compared with any speed of directional rotation imparted to the box 17, and by reason of this high ratio a complete rotation of the box imposes only a negligible error on the speed transmission.

Several gear boxes may be employed as required in order to furnish different scales of speed translation to the chart. The outer rim 29 of the gear box consists of a great wheel which engages with a pinion 30 mounted on the same spindle as an intermediate wheel 31 which in turn is driven by a pinion on the spindle of the compass motor 15, so that the transmissions from the compass are communicated in this way to the gear box for the purpose of setting the propelling wheel in the correct direction corresponding to the course. In order to indicate the actual course being steered, compass card indications may be marked on the cylindrical surface 32 of the gear box, a cross wire 33 being arranged on the carriage to form a lubber line so that the gear box functions also as a repeater compass or direction indicator, said indications being in agreement with the direction traced by the pencil on the roll. Minor details associated with the instrument consist of means for applying the necessary spring tension to the lever or arm 35 carrying the tracing pen or style these means being shown as consisting of a spring 36. A spring 37 shown attached to the bracket 3 which is pivotally supported, serves to maintain the paper roll or band 7 in a state of tension between the rollers so as to eliminate backlash in the driving band or chain 8.

Further details shown in the drawings consist of a switch 38 for regulating the supply of electrical current for controlling the apparatus and contacts 39 which are closed at the limits of movement of the pencil arm so as to sound an alarm bell or other signal when the carriage or pencil reaches the edge of the paper. The case of the instrument is also provided with suitable cable glands 40 for the entrance of the necessary cables communicating with the source of supply and the log and directional mechanism of the vessel. Inside the case is provided a terminal block 41 for these cables and for convenience in adjusting the flexible leads to the movable carriage. A detachable handle 42 on the outside of the case is provided for rotating the roll 5 to allow of a new surface on the paper roll to be presented to the tracer.

The intermediate roll may be dispensed with and the wheel 18 be arranged to make contact with the paper on the roll 5.

The mode of operation of the instrument is as follows:—

With the chart arranged so that the north-south direction thereon is vertical and if the vessel is sailing due north or south the propelling wheel 18 is in such a position that its plane is perpendicular to the axis of the roller 11. Consequently the wheel 18 drives the chart in the direction corresponding to due north and south at a speed proportional to the speed of the ship, the carriage not being moved on the rails in these circumstances. If the course of the ship is changed to due east and west the compass motor 15 moves the wheel 18 to such a position that its plane is coincident with a plane containing the axis of the roller 11. The carriage is moved on the rails therefore at a speed proportional to the speed of the ship, the chart or paper strip not being moved at all. For any intermediate course the wheel 18 takes up an intermediate position to those described and consequently drives the paper chart at a speed proportional to the component of the speed in the north-south direction and drives the carriage at a speed proportional to the east-west component of the speed. Consequently the marking device of the instrument traces out on the chart the course being traversed by the ship.

Having now particularly described and ascertained the nature of my said invention and in what manner the same is to be performed, I declare that what I claim is:—

1. Apparatus for indicating and recording the direction and distance of travel of a vehicle comprising a chart movable in one axis or direction in its own plane and a carriage carrying a marking device for making a record on the chart and movable along an axis at right angles to said first mentioned axis, the said carriage carrying propelling mechanism which drives the carriage and the chart at speeds the ratio of which is equal to the ratio of the two components of the direction being traversed at any instant by the vehicle.

2. Apparatus for indicating and recording the direction and distance of travel of a vehicle comprising a chart movable in one axis or direction in its own plane and a carriage carrying a marking device for making a record on the chart and movable along an axis at right angles to said first mentioned axis, the said carriage having a friction wheel adapted to drive the chart, the axle of the wheel being rotatable about an axis in the plane of the wheel and about which axis it is set according to the direction of travel of the vehicle and the wheel being rotated about its own axle at a speed proportional to the speed of the vehicle.

3. Apparatus for indicating and recording the direction and distance of travel of a vehicle comprising a chart movable in one axis or direction in its own plane and a carriage carrying a marking device for making a record on the chart and movable along an axis at right angles to said first mentioned axis, the said carriage having a friction wheel adapted to drive the chart, the axle of the wheel being rotatable about an axis in the plane of the wheel and about which axis it is set according to the direction of travel of the vehicle and the wheel being rotated about its own axle at a speed proportional to the speed of the vehicle through a reduction gearing of such high ratio that the error introduced by the rotation of the whole gearing relative to the driving element therefor due to the setting of the axle of the friction wheel about the said axis in its own plane is negligible.

4. Apparatus for indicating the course of travel of a vehicle comprising a chart movable in a given direction, a marking device movable in a direction at right angles to said first mentioned direction, and means for moving said chart and said device at speeds, the ratio of which is equal to the ratio of certain components of the direction being traversed at any instant by the vehicle.

5. Apparatus for indicating the course of travel of a vehicle comprising a chart, a relatively movable marking device, and means for moving said chart and said device at speeds, the ratio of which is equal to the ratio of certain components of the direction being traversed at any instant by the vehicle.

6. Apparatus for indicating the course of travel of a vehicle comprising a chart, a relatively movable carriage, a marking device carried by said carriage, and means for moving said chart and carriage at speeds proportional respectively to certain components of the velocity of the vehicle.

7. In apparatus for indicating the course of travel of a vehicle, a chart, a relatively movable carriage, a marking element carried by said carriage, propelling mechanism carried by said carriage and comprising a device responsive to the speed of the vehicle and a device responsive to the direction of travel thereof, and means controlled by said devices for driving said chart and carriage at speeds respectively proportional to certain components of the velocity of the vehicle.

8. In apparatus for indicating the course of travel of a vehicle, a movable chart, a carriage having a feed roller adapted to drive said chart, a marking element carried by said carriage, means for varying the plane of rotation of said roller in accordance with the direction of travel of the vehicle, a device responsive to the speed of the vehicle, and connecting means between said device and said roller for reducing to negligible limits the error introduced by varying the plane of rotation of said roller.

9. Apparatus for indicating the course of travel of a vehicle comprising a chart movable in a given direction, a marking device movable in a direction at right angles to said first mentioned direction, and means for moving said chart and said device at speeds proportional to the components of the velocity of the vehicle in said respective direction.

In testimony whereof I affix my signature.

ARTHUR ERNEST BREWERTON.